United States Patent
Morrison et al.

(10) Patent No.: US 6,173,962 B1
(45) Date of Patent: *Jan. 16, 2001

(54) BRUSH SEAL

(75) Inventors: Michael K. Morrison; Peter A. Withers, both of Bristol; Terence V. Jones, Oxford; Peter E. Wood, Crawley, all of (GB)

(73) Assignee: Rolls Royce PLC, London (GB)

( * ) Notice: Under 35 U.S.C. 154(b), the term of this patent shall be extended for 0 days.

This patent is subject to a terminal disclaimer.

(21) Appl. No.: 09/134,387

(22) Filed: Aug. 14, 1998

Related U.S. Application Data

(63) Continuation-in-part of application No. 08/757,165, filed on Nov. 27, 1996, now Pat. No. 5,799,952.

(30) Foreign Application Priority Data

Dec. 9, 1995 (GB) .................................................. 9525212

(51) Int. Cl.[7] .................................................. F16J 15/447
(52) U.S. Cl. .......................... 277/355; 277/387; 277/388; 277/926
(58) Field of Search .................................. 277/355, 387, 277/388, 401, 926

(56) References Cited

U.S. PATENT DOCUMENTS

| | | | |
|---|---|---|---|
| 5,174,582 | 12/1992 | Ferguson | 277/53 |
| 5,351,971 * | 10/1994 | Short | 277/53 |
| 5,401,036 | 3/1995 | Basu | 277/53 |
| 5,474,305 | 12/1995 | Flower | 277/53 |
| 5,568,931 | 10/1996 | Tseng et al. | 277/53 |
| 5,799,952 * | 9/1998 | Morrison et al. | 277/355 |

FOREIGN PATENT DOCUMENTS

| | | |
|---|---|---|
| 0 617 216 A1 | 9/1994 | (EP) . |
| 0 639 735 A1 | 2/1995 | (EP) . |
| 2198195 | 6/1988 | (GB) . |
| 2258277 | 2/1993 | (GB) . |

* cited by examiner

*Primary Examiner*—Anthony Knight
*Assistant Examiner*—Enoch Peavey
(74) *Attorney, Agent, or Firm*—Oliff & Berridge, PLC

(57) ABSTRACT

A brush seal includes a mounting ring that carries radially inwardly directed bristles. A backing member attached to the mounting ring is positioned alongside the bristles. A chamber defined by the bristles and the backing member is pressurized with fluid to counteract the lateral forces imposed upon the bristles by a region of high fluid pressure that they are operationally adjacent. As a result of this balancing of forces, the bristles are free to move radially inward and outward so that their free ends remain in sealing engagement with an adjacent surface.

26 Claims, 7 Drawing Sheets

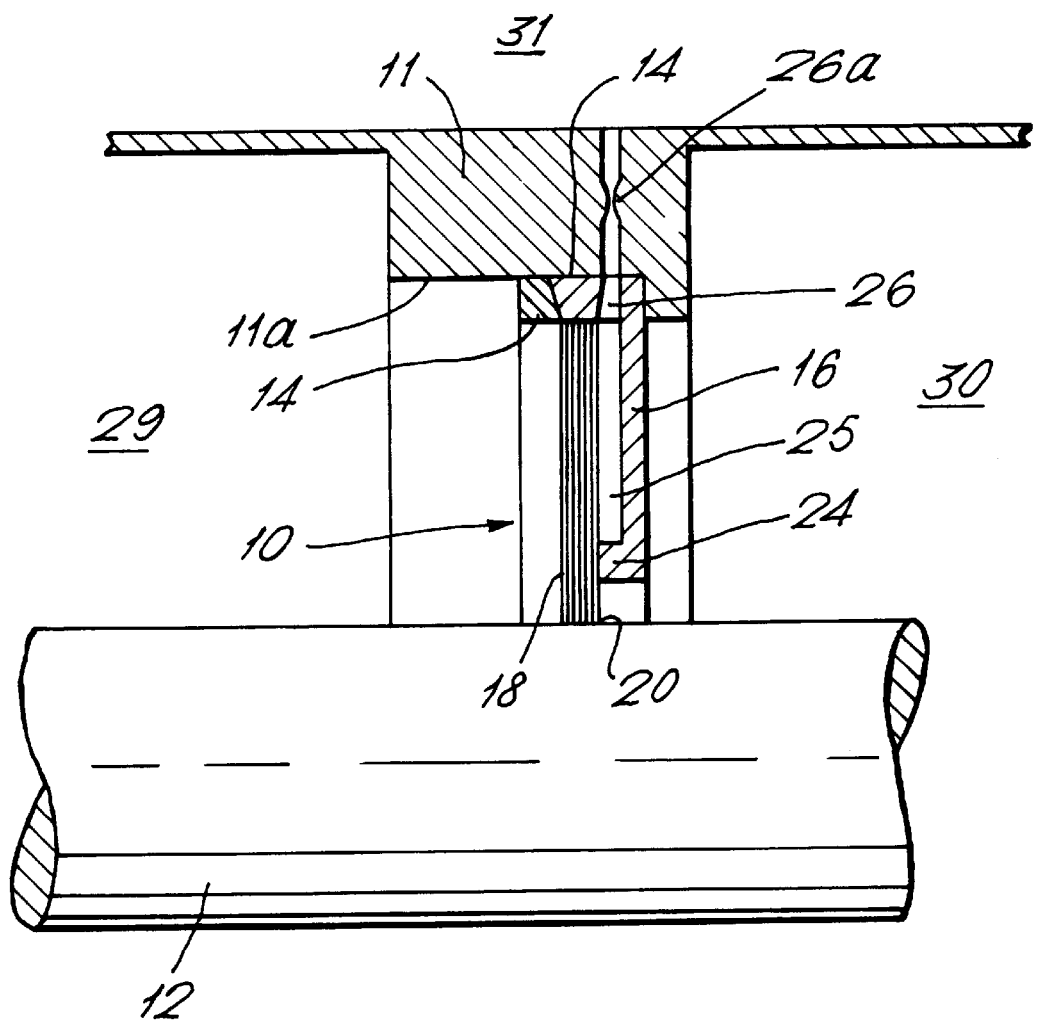

BRUSH SEAL

This is a continuation-in-part of U.S. patent application Ser. No. 08/757,165, filed Nov. 27, 1996, now U.S. Pat. No. 5,799,952 which is incorporated herein by reference.

BACKGROUND OF THE INVENTION

1. Field of Invention

This invention generally relates to a fluid seal and more particularly relates to a brush seal for sealing a leakage path between relatively movable parts.

2. Description of Related Art

It is well known to use a brush seal to establish a fluid seal between relatively movable components. Typically, the seal comprises a pack of resilient bristles that are fixed to one of the components and are in sliding relationship with the other component. For instance, an annular brush seal positioned in a leakage path between a rotatable shaft and static structure surrounding the shaft. The seal bristles in such an application are normally bonded to a mounting ring in turn carried in the static structure. The bristles are generally radially inwardly directed so that their free ends engage the shaft in sliding relationship. Together, the bristle pack and the shaft surface cooperate to define a leakage barrier between a region of high fluid pressure and a region of low fluid pressure.

Under the influence of a pressure drop the bristles tend to deform. To counter this effect, a backing member is used to provide additional support for the bristles on the downstream, low pressure side of the bristles and extends from the mounting member alongside the downstream face of the bristle pack to terminate short of the free ends of the bristles, thereby providing the necessary degree of lateral support for the bristles.

A drawback in the use of such backing member is that as a result of the pressure drop that exists across them the bristles are urged into frictional engagement with the face of the backing member. The restoring forces provided by the inherent resilience of the bristles and other forces are thus inhibited. The loss of this restoring force is highly undesirable in view of the adverse effect that it can have upon sealing efficiency. For instance, in the above example if the shaft makes a temporary excursion from its normal position, the bristles will be deflected radially outwards and may be frictionally constrained from returning to their normal position. This will in turn result in a gap opening between the bristles and the shaft surface and consequently increased seal leakage. In similar circumstances some bristles adopt a more radial disposition and thus by being frictionally constrained, increase the contact pressure between the bristles and the rotor with consequent increase of bristle wear, increased leakage and reduced seal life.

EP0617216 A1 describes a brush seal arrangement in which the problem of bristle restoration force loss is addressed. In that arrangement, the backing ring is spaced apart from the majority of the bristles so that any frictional engagement between them is minimized. However, if the pressure drop across the bristles is high, there is a danger that the bristles will distort laterally and frictionally engage the backing ring, thereby resulting in a loss of the bristle restoring force.

SUMMARY OF THE INVENTION

The invention is directed to a brush seal that overcomes one or more of the disadvantages in the related art.

In one aspect, a brush seal includes a backing member and a bristle layer positioned on one side of the backing member and interposed between the bristle layer and a low fluid pressure region. A portion of the bristle layer is spaced from the backing member to define at least one chamber between the bristle layer and the backing member and adjoining the bristle layer. Means are provided for supplying the at least one chamber with fluid at a pressure higher than the pressure of the low fluid pressure region.

In another aspect, a brush seal includes a bristle layer and a backing member, where the backing member and a portion of bristle layer define a chamber between the backing member and the bristle layer. Means are provided for supplying the chamber with fluid at a pressure higher than the pressure of the low fluid pressure region to support the portion of the bristle layer out of contact with the backing member.

In another aspect, a brush seal includes a bristle layer and a backing member positioned between the bristle layer and a second fluid pressure region. The backing member contacts the bristle layer at first and second locations along a length of the bristle layer and is spaced from the bristle layer in an area between the first and second locations to define a chamber between the bristle layer and the backing member. The chamber is pressurized at a pressure higher than the second fluid pressure region to maintain a second surface of the bristle layer out of contact with the backing member between the first and second locations.

In a further aspect, a method for sealing a leakage gap between relatively movable parts in a flow path between a high fluid pressure region and a low fluid pressure region includes positioning a bristle layer between the high and low fluid pressure regions and positioning a backing member between the bristle layer and the low fluid pressure region. The backing member and a portion of the bristle layer define a chamber between the backing member and the bristle layer. The chamber is supplied with fluid at a pressure higher than the pressure of the low fluid pressure region to support the portion of the bristle layer out of contact with the backing member.

BRIEF DESCRIPTION OF THE DRAWINGS

The present invention will now be described, by way of example, with reference to the accompanying drawings in which:

FIG. 1 is a sectional view of an annular brush seal element according to the invention;

FIG. 8b is a view along arrow B of FIG. 8a;

DETAILED DESCRIPTION OF PREFERRED EMBODIMENTS

Figure 2A:
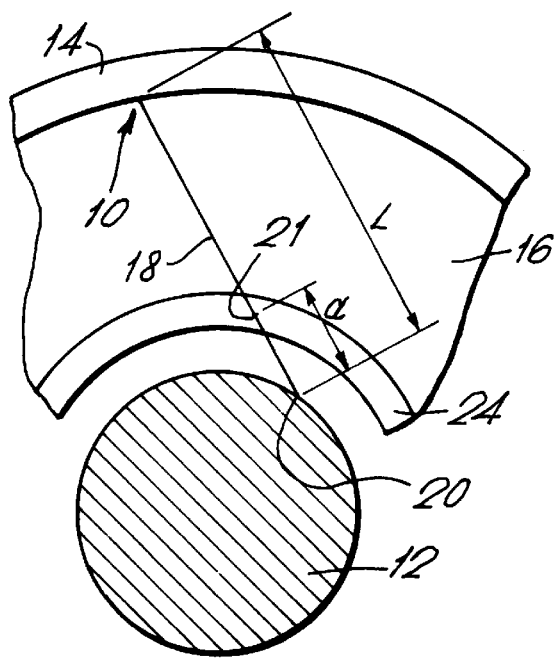
FIGS. 2a and 2b show a detail view illustrating the dimensions and parameters of the brush seal element of FIG. 1.
Figure 2B:
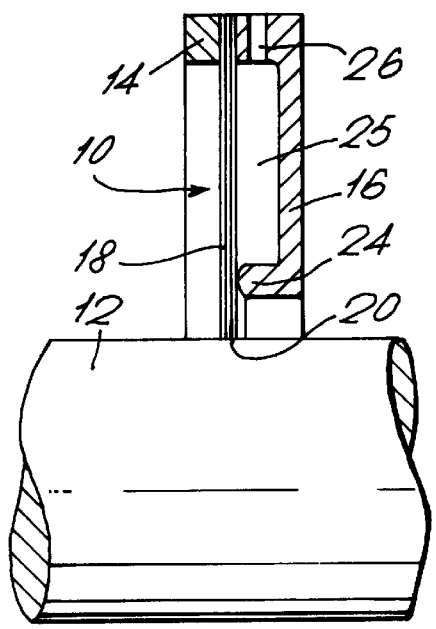

With reference to FIG. 1, the arrangement includes a single brush seal element generally indicated at 10 positioned between relative movable parts, comprising an annular static part 11 and a rotatable shaft 12. The brush seal element 10 is located within a housing recess 11a defined by the radially inner portion of the static part 11.

The brush seal element 10 comprises a mounting ring 14, an annular backing member 16 and an annular layer of tightly packed, radially inwardly directed bristles 18. The bristles layer or path is formed from a multiplicity of tufts of lengths of resilient wire secured between the mounting ring 14 and the backing member 16 by any suitable joining technique, such as welding or brazing. The particular technique employed will, of course, be dictated by the particular choice of materials employed and the temperatures at which they will be expected to operate. In the present example, the bristles 18 are cobalt alloy wire and the mounting ring 14 and backing member 16 are nickel based, or a compatible alloy, and are welded together into an integral unit.

As is well known in the art, the bristles 18 are inclined in the circumferential direction so that their free ends 20 engage the surface of the shaft 12 lightly and at an angle to a tangent thereto, see FIG. 2a.

The backing member 16 extends in a radially inward direction from the mounting ring 14 towards free ends of the bristles 20 and the shaft 12. Its inner diameter is greater than the surface diameter of shaft 12 being a clearance distance sufficient to accommodate thermal growth effects and orbital movements of the shaft 12 within design limits. The backing member 16 is positioned adjacent the downstream face of the layer of bristles 18 so as to provide lateral support for the bristles 18 in the axial direction, from left to right as viewed in FIG. 1.

Figure 5:
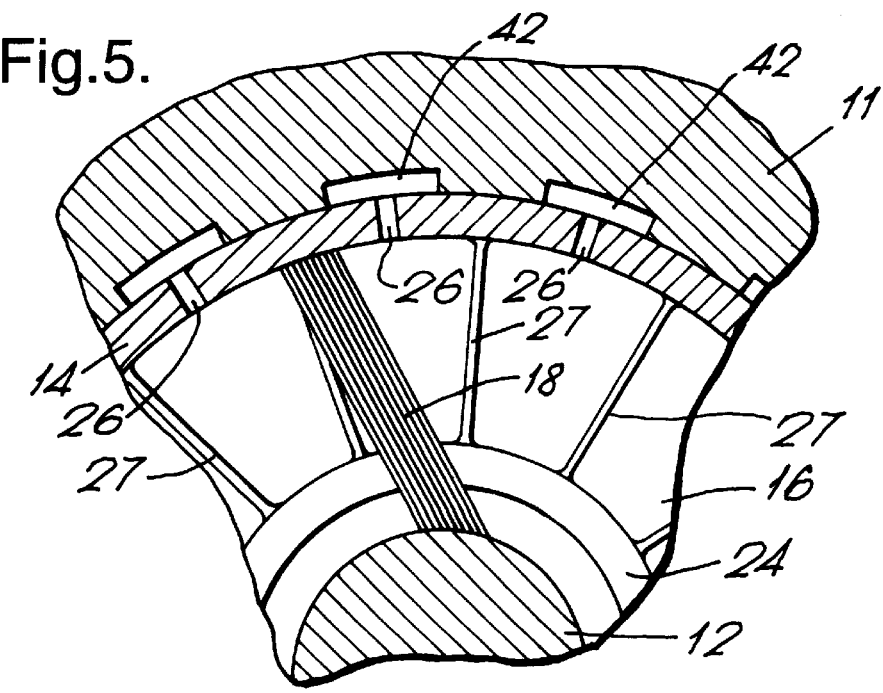
FIG. 5 is a view on section line A—A of FIG. 4.

The backing ring of a usual brush seal element of conventional design has a planar face towards the bristle layer and is in nominal contact therewith across the whole of its surface. In accordance with the present invention the backing member 16 of the brush seal element 10 has, for much of its radial depth, an axially spaced relationship with the adjacent face of the pack of bristles 18. More specifically, the radially inner circumference of the backing ring 16 is provided with an axially directed, upstanding annular flange 24 which engages the bristles 18. The lip of this flange 24 providing an annular contact surface with the downstream face of the bristle layer may be rectangular, but preferably is radiused to avoid sharp edges against the bristle regardless of contact angle. However, the remainder of the backing ring 16 is axially spaced from the layer of bristles 18 so that backing ring 16, flange lip 24 and the bristle layer cooperate to define an annular chamber 25. In this its simplest form, the chamber 25 extends continuously around the full circumference of the backing member but it may be subdivided into part-annular segments by radial walls 27 (see FIG. 5), for example, in effect forming a plurality of such chambers. Subdividing the chamber as shown in FIG. 5 is advantageous in that it restricts circumferential fluid flow within the chamber. Significant circumferential flow within the chamber is undesirable because it may disturb the bristle layer, thereby reducing seal performance. By restricting circumferential flow, the embodiment shown in FIG. 5 may increase yield performance.

Means is provided in communication with said chamber 25 or chambers, consisting in FIG. 1 of a plurality of radially extending passages 26 in the radial outer portion of the backing ring 16, to interconnect the annular chamber 25 or each said part annular chamber with a region 31 of pressurized fluid. The source of the pressure is chosen such that the pressure in region 31 is higher than in upstream region 29 and downstream region 30. By careful selection of the seal geometry and the pressure source for region 31, a brush seal element can be designed in which, in use, the force exerted on the bristle layer by fluid in the chamber 25 balances the opposing force due to fluid in a region 29 upstream of the seal so that there are generally no net lateral forces between the bristles 18 and the annular flange lip 24. This reduces or substantially eliminates the radially constraining frictional force on the bristles 18. If the pressure of source 31 is too high the forces acting on the pack of bristles 18 will cease to be balanced. If the pressure differential across the bristle pack is too high then fluid flow through the pack increases to a level at which the bristles 18 are disturbed and leakage passed the annular seal lip 24 also increases. Clearly at, and nearby, the seal design point sealing efficiency is strongly influenced by the balance flow rate. Since this balance leakage flow enters the chamber, or chambers, 25 through at least one orifice 26 the relationship between the leakage flow and the balance of forces across the bristle pack can be governed by the throat area of the orifice 26. As the pressure drop across the restriction of the throat is dependent upon flow the total throat area of the connecting passage between region 31 and chamber 25 can be chosen to effectively govern the seal balance forces. In FIG. 1 the throat restriction is provided by a constriction 26a in a communicating passage formed in housing 11.

FIG. 2a shows a schematic layout of a brush seal element 10 according to the invention to illustrate the derivation of the pressure balancing formulae. Each bristle 18 of overall length be considered as an uniformly loaded, cantilevered beam pivoted at its proximal end 19 and propped at a point of contact 21 with the upstanding lip 24 of the backing member 16 at some intermediate point distance a from the distal end of the bristle. Thus, three regions of pressure have to be considered, as follows: an upstream pressure Pu in region 29 which acts over the whole length L of the bristles 18, a downstream pressure Pd in region 30 which acts over the part length a of the bristles, and a balancing pressure Pb in chamber 25 which acts over the remaining bristle length (L−a) It can be shown that these dimensions and pressures are linked by the expression:

$$Pb/Pd = 1 + (Pu/Pd - 1)\frac{(a/L)^4 - 4a/L + 3}{3(1 - a/L)^4}$$

$$\text{Substituting } X = \frac{(a/L)^4 - 4a/L + 3}{3(1 - a/L)^4}$$

then $Pb/Pd = 1 + X(Pu/Pd - 1)$

Note also that $$Pb/Pu = \frac{Pb/Pd}{Pu/Pd}$$

Thus, for a particular seal geometry which determines the bristle ratio a/L then the balance pressure ratio Pb/Pd can be determined as a proportion of the total seal pressure ratio Pu/Pd. A range of example values is given in Table 1 below.

TABLE 1

| a/L | X | Pb/Pd |
|---|---|---|
| 0 | 1.0 | 1.0 Pu/Pd |
| 0.05 | 1.15 | 1.15 Pu/Pd - 0.15 |
| 0.10 | 1.32 | 1.32 Pu/Pd - 0.32 |
| 0.15 | 1.53 | 1.53 Pu/Pd - 0.32 |
| 0.20 | 1.79 | 1.79 Pu/d - 0.79 |
| 0.25 | 2.11 | 2.11 Pu/Pd - 0.11 |
| 0.30 | 2.51 | 2.51 Pu/pd - 1.51 |

The above equations can be further used to calculate the balance pressure required for a given total seal pressure ratio in a given seal design, that is where the ratio a/L is fixed. Table 2 contains the calculated pressure ratios Pb/Pd and Pb/Pu for several typical total pressure ratios Pu/Pd for a/L equal to 0.2.

TABLE 2

| Pu/Pd | Pb/Pd | Pb/Pu |
|---|---|---|
| 2.50 | 3.69 | 1.48 |
| 2.25 | 3.24 | 1.44 |
| 2.00 | 2.79 | 1.40 |
| 1.75 | 2.34 | 1.34 |
| 1.50 | 1.90 | 1.26 |
| 1.25 | 1.45 | 1.16 |

Those skilled in the art will be aware that brush seals are inherently leaky and are designed for a lower, but finite, leakage flow rate through the bristle layer. In a seal according to the invention leakage flow occurs from the source of balance pressure 31 and in the normal flow path direction. Thus, the total seal mass flow rate is equal to the sum of the "normal" mass flow rate plus the balance flow rate. If these flows are assumed to be flows through an orifice then conventional flow theory can be applied and we can calculate the relative sizes of the flow areas of the balance chamber $A_2$ and of the axial seal gap $A_3$. However, in the same regions the pressure driving these flows also acts on the bristles 18 themselves so, in use, the upstream and downstream directed forces must be in equilibrium if the bristles 18 are stable and the downstream face of the bristle pack remain just in contact with the tip of the annular lip 24. From this condition we can calculate the effective obstruction area of the bristles. Comparison of these two results for a brush seal of a conventional kind otherwise than for the provision of a balance chamber 25 indicates the bristle layer areas $A_2, A_3$ derived by means of mass flow conservation are incompatible with the same areas derived by considering forces equilibrium. It would appear that a balanced seal of the kind illustrated in FIG. 1 may exhibit excessive flow from the balance chamber 25.

Figure 3:
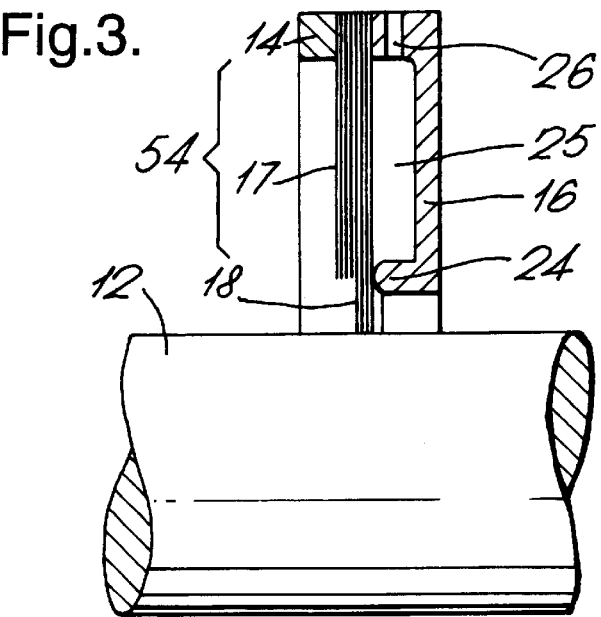
FIG. 3 shows a modified embodiment of a brush seal element according to the invention.

A solution to this problem is to reduce flow through the bristles overlying the balance chamber 25. This may be achieved by an additional porous layer overlying the face of the bristle pack in that region 54. Preferably such an additional layer should not significantly damp the bristles to inhibit their ability to accommodate shaft movement etc. A proposed arrangement which meets these criteria is shown in FIG. 3 wherein an additional layer of bristles 17 is provided on the upstream face of the pack of bristles 18 extending inwardly from the radially outer circumference of the annular mounting ring 14 to overlap the annular lip 24 at the inner circumference of the backing member 16.

A convenient pressure source 31 may not always be available. This can be overcome by arranging the balanced brush seal element of FIG. 1 in series relationship with a further seal element so that a chamber is defined between them, said further seal being operationally interposed between said brush seal element and said region of high fluid pressure so that fluid in said chamber between said brush seal element and said further seal element is at a pressure intermediate those in said regions of high and low fluid pressure.

Figure 4:
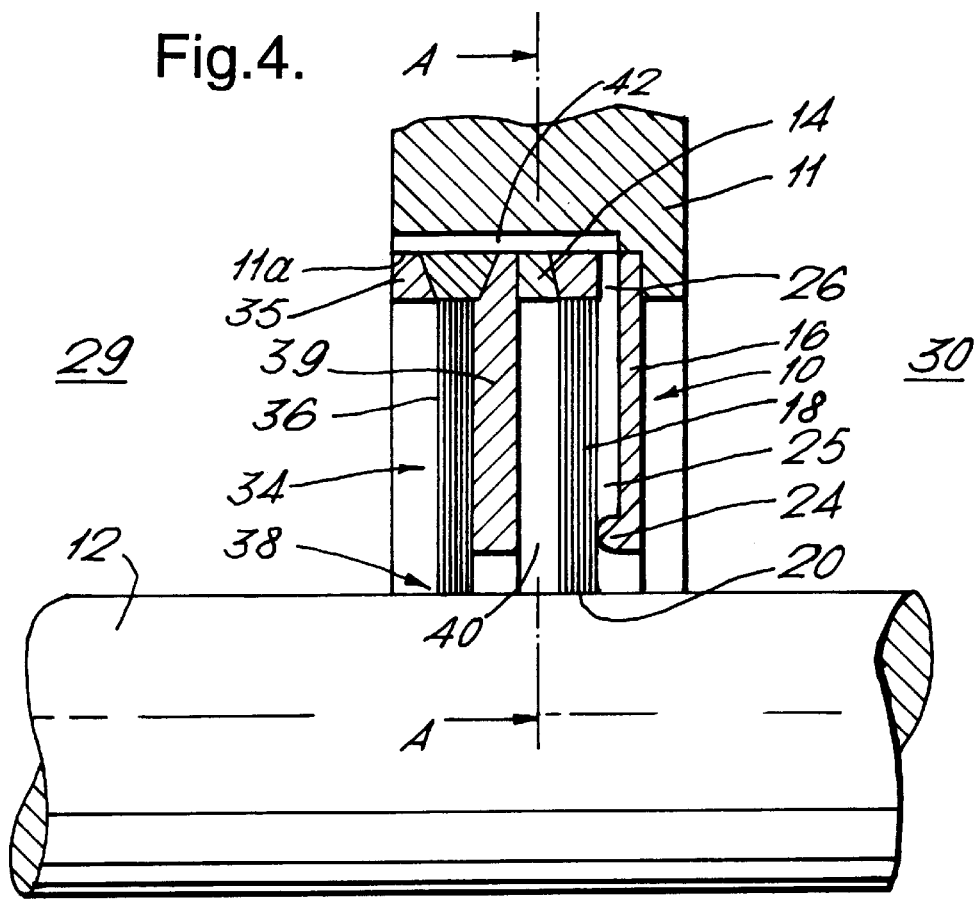
FIG. 4 is a similarly sectioned view of a brush seal arrangement incorporating twin seals including a brush seal element in accordance with FIG. 1.

FIG. 4 shows a brush seal arrangement comprising first and second brush seal elements 34 and 10 respectively that are positioned adjacent each other in series relationship and are located within a housing 11a defined by the radially inner portion of the static part 11. For the sake of comparison between drawings like parts carry like reference numerals.

The first upstream brush seal element 34 is of generally conventional configuration. It comprises a mounting ring 35 that carries an annular array of radially inwardly directed bristles 36. The bristles 36 are formed from a plurality of resilient wire pieces that are attached to the mounting ring 35 by any suitable joining technique such as welding or brazing. The particular technique employed will, of course, be dictated by the particular choice of materials employed and the temperatures at which they will be expected to operate. In the present example, the bristles 36 are welded to the mounting ring 35.

The bristles 36 in common with the downstream seal 10 are slightly inclined to the radial direction so that their free ends 28 engage the surface of the shaft 12 lightly.

The mounting ring 35 also carries a backing ring 39 which, in this particular case, is an integral part of the mounting ring 35. The backing ring 39 extends in a radially inward direction from the mounting ring 15 towards the shaft 12. However, it terminates short of the shaft 12 by its running clearance. The face of the backing ring 39 is planar and lies against the rear face of the pack of bristles 36 so as to provide lateral support for the bristles 36 in the direction from left to right as viewed in FIG. 4.

The second brush seal element 10 is as previously described with reference to FIG. 1, i.e., in accordance with the present invention, and is positioned on the right hand side of the first brush seal element 34 as viewed in FIG. 4 so that the two seal elements 10 and 34 are in series relationship with each other.

The upstream face of the bristle pack of the second, downstream seal 10 is spaced a short distance from the downstream face of the backing member 39 of the first, upstream seal 34 by the axial extent of the mounting ring 14 of the second brush seal element 10. Thus, an annular chamber 40 is defined between the bristles 18 of the second brush seal element 10 and the backing ring 39 of the first brush seal element 34.

A plurality of radially extending communication holes 26 in the radially outer portion of the backing plate 16 of seal 10 interconnect the annular chamber 25 with a plurality of axially extending passages or grooves 42 cut into the face of the recess 11a and bounded by the abutting mounting rings 35 and 14 as shown in FIGS. 4 and 5. The passages 42 terminate at the face of the housing 11 in communication with the region 29 on the left hand side of the brush seal arrangement as viewed in FIG. 4. It will be seen therefore that the fluid pressure in the annular chamber 25 will be the same as that in the region 29. The pressure in the intermediate chamber 40 will be lower, however, by virtue that it is vented by leakage through the pack of bristles 18 of the seal 10 into low pressure region 30 and is fed by leakage from the high pressure region 29 through two paths. One path is via leakage through the pack of bristles 36 of the upstream seal 34 and the other is via balance air leakage from the balance chamber 25 of the downstream seal 10. Leakage of pressurized fluid from the chamber 40 into the region of low pressure 30 is inhibited by the second brush seal element 10. The pressurized fluid in the balance chamber 25 is derived from the high pressure fluid region 29 via the passageways 42 and 26 defined by the annular static part 11 and the mounting rings 14 and 35. The dimensions of the passageways 42 are chosen so that at the design leakage flow the fluid pressure within the chamber 25 is approximately equal to that in the chamber 29. As a consequence of this, there are virtually no net lateral forces exerted upon the bristles 18 of the second brush seal element 10.

In the event of a radial excursion by the shaft 12, the bristles 18 and 36 of the brush seal elements 13 and 34 are deflected in a radially outward direction. The pressure drop across the first brush seal element 34 is insufficient to result in significant lateral forces being exerted upon the bristles 36. Consequently when the shaft 12 returns to its original position, the frictional interaction between the bristles 36 and the backing ring 39 is insufficient to prevent the bristles 36 from returning to their original position engaging the shaft 12. The first seal element 34 therefore continues to perform a sealing function under these circumstances.

When brush seal elements are arranged in series relationship it is the final element in a series, that is, the seal adjacent the region of low fluid pressure, which is generally subject to the greatest pressure drop. Consequently, the second brush seal element 10 is subject to a larger pressure drop across it than the first brush seal element 34. In the case of a conventional downstream seal this would result in the bristles 18 frictionally engaging the backing ring following a radial excursion of the shaft 12 thereby damping the bristles 18. A clearance gap would then be created between the bristles free ends 20 and the shaft 12, leading in turn to an increased fluid leakage rate through the gap. However, in the case of the present invention, the balancing of fluid forces on each side of the bristles 18 of the downstream seal element 10 substantially reduces bristle damping effects. The only region of the backing ring 16 contacted by the bristles 18 is the flange 24 and the lateral forces on the bristles 18 are consequently low. The inherent resilience of the bristles 18 is therefore sufficient to return them into engagement with the shaft 12 following a radial excursion.

Under certain circumstances, it may transpire that the pressure drop across the first, upstream brush seal element 34 is too great to ensure effective operation of the second, downstream brush seal element 10 because the distribution of pressure differential is distorted and too much is carried by the upstream seal 34. Thus the resultant pressure within the chamber 40 between the brush seal elements 34 and 10 could be too low to provide an effective pressure balance across the bristles 18 of the second, downstream brush seal element 10. If this happens, it is desirable to increase the fluid pressure within the intermediate chamber 40.

Figure 6:
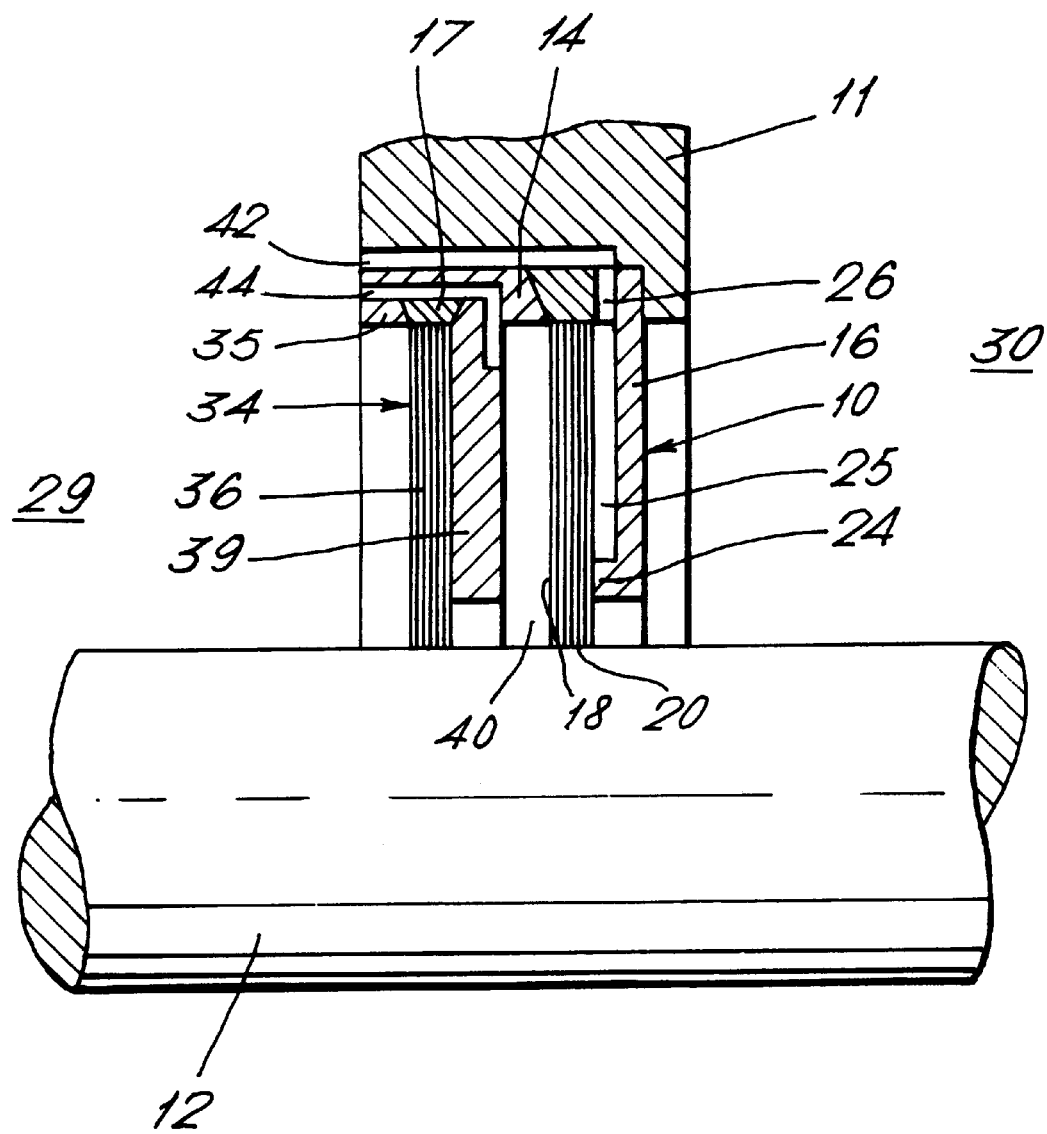
FIG. 6 is a view similar to that of FIG. 4 showing a brush seal arrangement with alternative pressure connections.

The further embodiment illustrated in FIG. 6 is intended to provide a solution to this drawback. Again as compared to the embodiment shown in FIG. 4 like parts carry like references.

This is achieved by the provision of a further set of passages 44 interconnecting the region of high fluid pressure 29 with the intermediate chamber 40, thereby providing an increase in fluid pressure within the chamber 40 as compared to the arrangement of FIG. 4. The dimensions of the passages 44 are chosen so that the resultant pressure within the intermediate chamber 40 is approximately equal to that in the balance chamber 25 of the second brush seal element 10.

Although the present invention has been described with reference to a balanced brush seal element 10 in which the balance chamber 25 defined is pressurized with fluid derived from the region of high fluid pressure 29, it will be appreciated that this is not in fact essential and the pressurized fluid could be derived from another suitable source.

Under certain circumstances there may be a requirement to maintain a degree of axial contact force between the bristles 18 and the annular flange 24. The invention can accommodate this situation by suitable adjustment to the intermediate chamber cavity pressure 40. The required pressure can be assessed using a knowledge of the desired axial contact load and a modification of the pressure ratio assessment technique described. This could be done, for instance, if the fluid pressure difference between the regions 29 and 30 is not great. Further, although in the brush seal arrangement described above in respect of FIGS. 4, 5 and 6, the first seal element 34 is in the form of a brush seal, this is not in fact essential. The seal element 34 need only be of a type capable of providing a pressure drop across it that is consistent with the achievement of a balance of fluid pressures in the chambers 25 and 40.

Under certain circumstances in the embodiment of FIG. 4, it may be possible to dispense with the first brush seal element 34 and rely entirely on the second brush seal element 10. That is, the annular chamber 25 is vented to the high pressure region 29. A particularly advantageous arrangement is illustrated as a further embodiment in FIG. 7. Again as compared to the previous embodiments like parts carry like references.

In this embodiment it has been recognized that in the annulus radially outside of the shaft 12 a forced vortex (solid body rotation) is generated by the rotating shaft 12. This vortex creates a pressure gradient in a radial direction such that the fluid pressure increases with radial distance from the rotor surface.

If required various features (not shown) known in the art can be added to the rotating shaft 12 to encourage and promote the formation of a vortex. Such suitable features include for example a number of circumferentially disposed longitudinal axial vanes mounted upon the outside of the shaft 12. Alternatively the outer surface of the shaft 12 can be roughened or dimpled. By the use of such features a stronger vortex can be produced which has a greater radial pressure gradient. Such an induced vortex will thereby give rise to a higher pressure at the radially outer positions than exists with an non-induced vortex.

The effect of a vortex is shown by considering a finite fluid element. By continuity the resultant force in the axial direction on the finite fluid element due to a radial pressure gradient can be defined as:

$$F_x = -(\delta P/\delta x)\delta x.\delta y.\delta Z \qquad \text{Eqn 1}$$

where

F=resultant force in the axial direction

Figure 7:
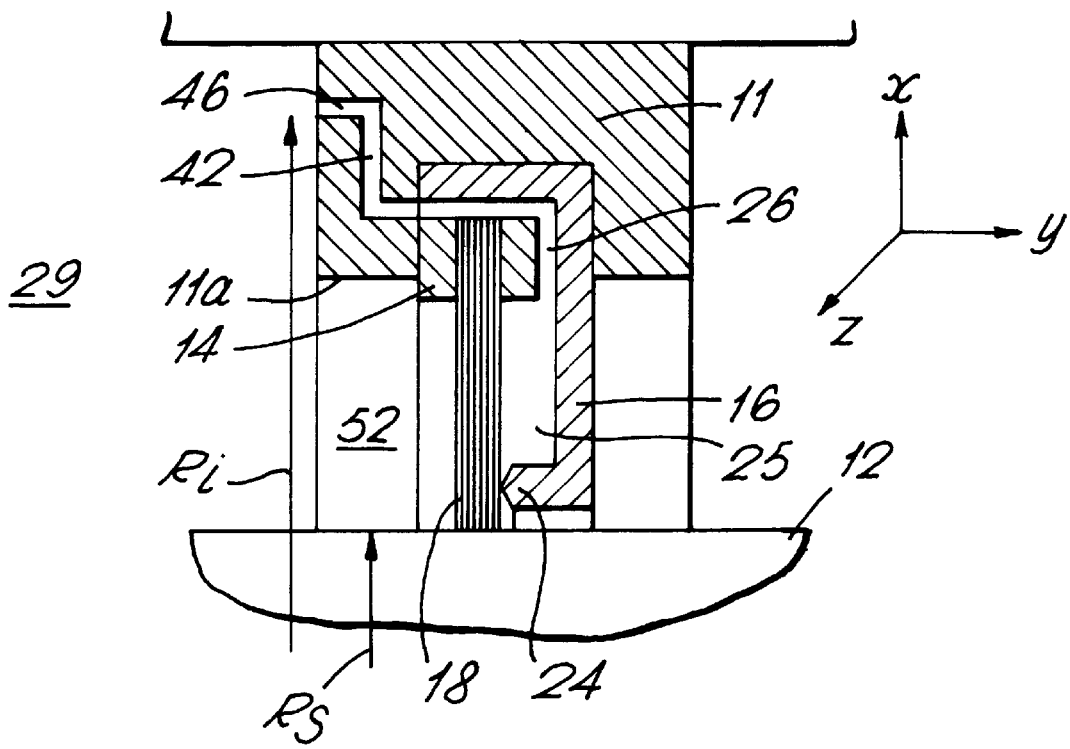
FIG. 7 shows a further embodiment of a brush seal element according the invention.

P=Pressure and x is the radial direction y is the axial direction z is the circumferential direction all shown on FIG. 7.

Newtons Second law applied to the same element gives:

$$F_x = a_x \rho \delta x.\delta y.\delta Z \qquad \text{Eqn 2}$$

where
p=fluid density
For a forced vortex (solid body rotation)

$$a_x = -\omega^2 r \qquad \text{Eqn 3}$$

where
r=radius
ω=angular velocity
For solid body rotation the angular velocity ω is constant for all r.
Combining equations 1,2, & 3 and integrating gives:

$$P = \frac{(\rho \omega^2 r^2)}{2} + A \qquad \text{Eqn 4}$$

where A is a constant of integration determined by the boundary conditions.

This gives that the pressure increases with distance from the rotor 12 surface.

Hence the upstream face of the brush seal 52, which is close to the shaft 12 surface, is subject to a lower upstream pressure $P_u$ than a similar point at a greater radius.

As shown in FIG. 7 a supply passage 26, 42 interconnects the annular cavity 25 with the upstream side of the seal. The pressure supplied to the cavity 25 therefore approaches the pressure at the inlet 46 to the supply passage 42 (assuming no pressure loss in the supply passages 42, 26). Since the inlet 46 is at a more radially outward position $R_i$ than the bristles 18 a higher pressure is supplied to the cavity 25 than is seen at the upstream face of the bristles 52. Consequently a partial or total pressure balance across the bristle pack can be achieved.

Using a simple pressure tapping lying in the radial plane of the shaft 12 as the supply passage 42 inlet 46 the pressure in the cavity 25 will approach the static pressure that exists in the vortex at that radial position $R_i$. If a higher cavity supply pressure is required then the tapping/inlet 46 can be positioned at a greater radial position. This however may not always be practical or alternatively still may not provide a sufficiently high enough cavity supply pressure.

Figure 8A:
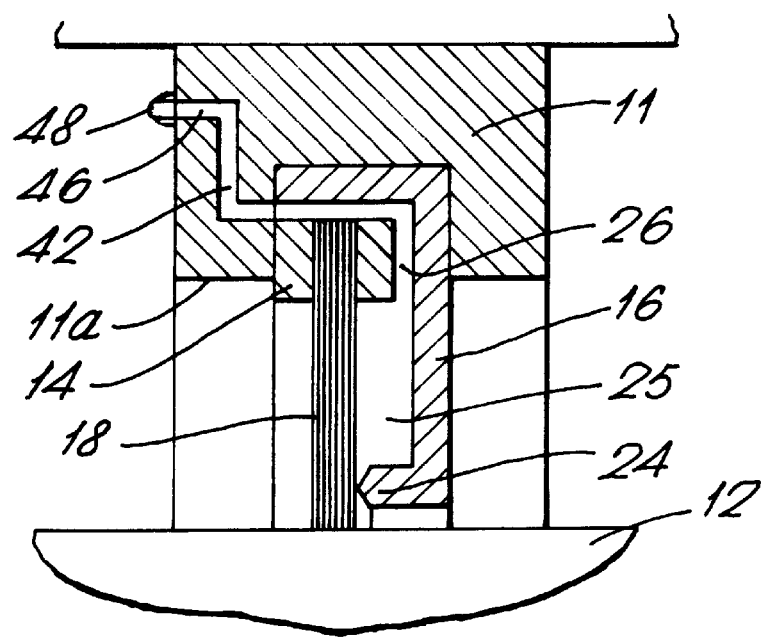
FIG. 8a shows another embodiment of a brush seal element according to the invention.
Figure 8B:
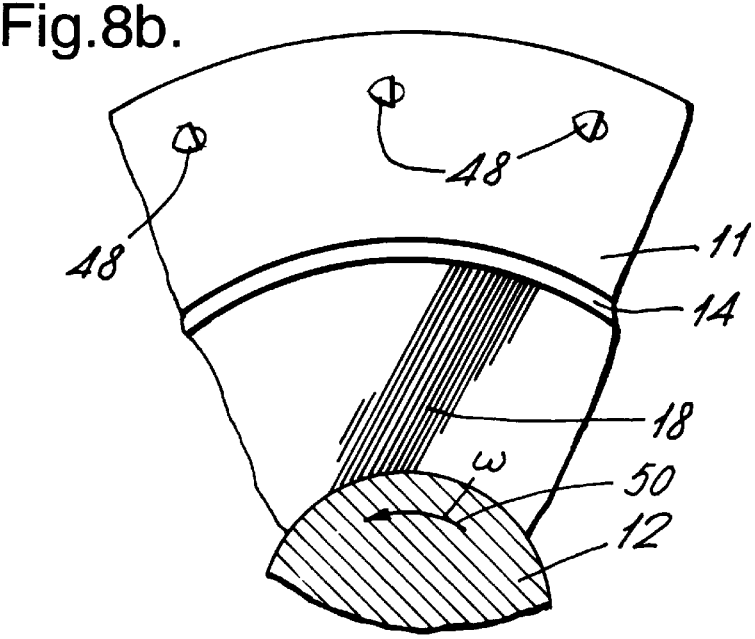

A solution to the above problem is illustrated in the embodiment shown in FIGS. 8a and 8b. The supply pressure inlet 46 is provided with a funnel shaped scoop 48 such that the inlet plane is now substantially perpendicular to the direction of the flow in the vortex; i.e., substantially perpendicular to the plane of the brush seal. Thus the flow in the vortex enters the cavity supply inlet 46 and the dynamic head of the vortex at that radial position $R_i$ is also recovered. By this arrangement the cavity supply pressure approaches the higher total pressure (dynamic+static) that exists in the vortex at the inlet radius $R_i$.

It will be appreciated that, if required, the cavity supply pressure can be reduced by providing a constriction in the supply passage 42, 26 similar to the constriction 26a shown in FIG. 1. Therefore by careful design the required cavity pressure can be supplied to the cavity to enable the forces on the bristle pack to be balanced.

Figure 9:
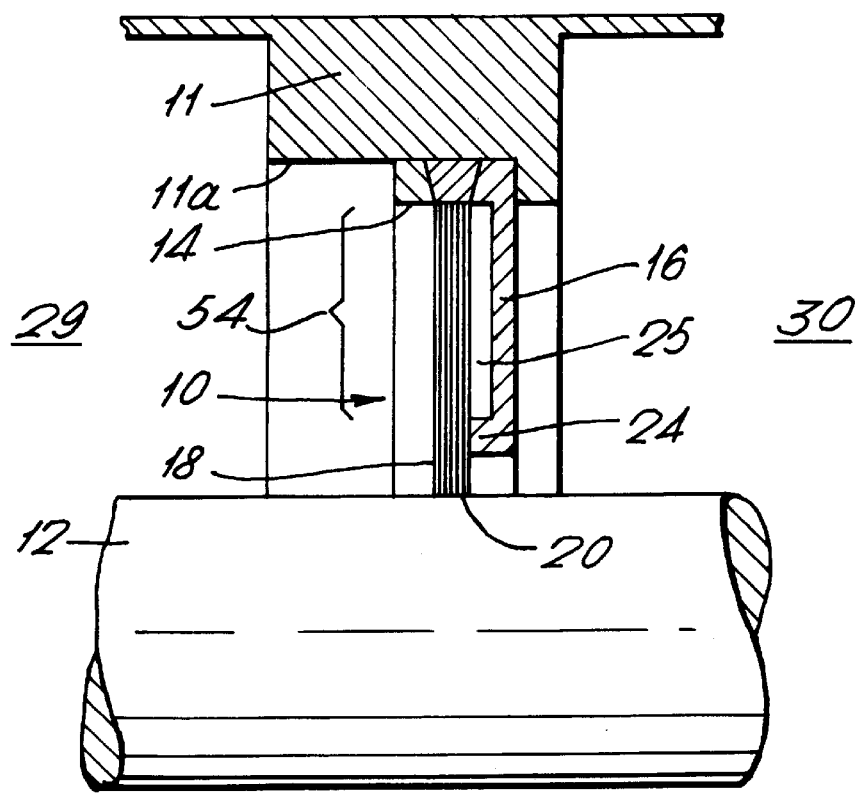
FIG. 9 shows a further embodiment of a brush seal element according to the invention.

A further embodiment is illustrated in FIG. 9, where again as compared to the previous embodiment like parts carry like references. This embodiment is substantially the same as that shown in FIG. 1 except that there is no separate pressure supply to the cavity 25 as are present in previous embodiments. Hence there are no radially extending passages 26 or supply passages 42 interconnecting the cavity 25 with a region of pressurized fluid 31. The pressure in the cavity 25 is determined by the pressure and leakage flow from the upstream region 29 through the bristles in the region 54 overlying the cavity 25; and the leakage flow out of the cavity 2 past the annular lip 24. It may therefore be advantageous to increase the porosity of the bristles 18 to encourage leakage through the bristles 18 in this region 54. However increasing the porosity of the bristles 18 will increase leakage over the entire bristle length which could reduce seal performance.

Consequently, in this embodiment, once a steady condition is reached an intermediate equilibrium cavity 25 pressure is established. This pressure being between the high upstream pressure in region 29 and the lower downstream pressure in region 30. The intermediate pressure in the cavity 25, although not high enough to completely balance the forces on the bristle pack 18, is above the downstream pressure in region 30 and so partially balances the forces on the bristle pack 18. It has been found that in practice even such a partial force balance can improve the performance of the seal.

Figure 10A:
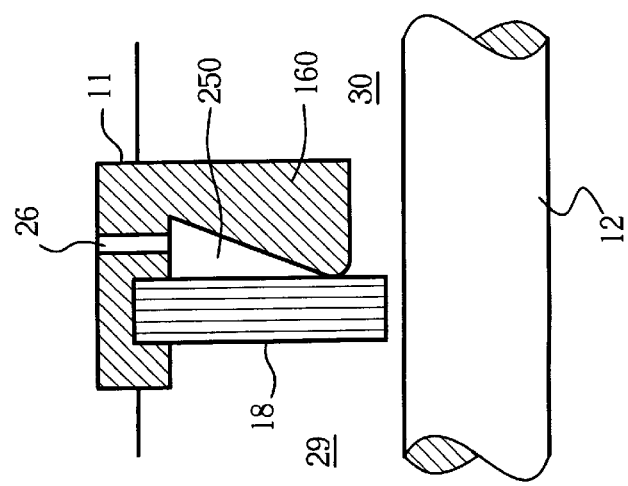
FIGS. 10a–10c are diagrams depicting further embodiments of a brush seal element according to the invention.
Figure 10B:
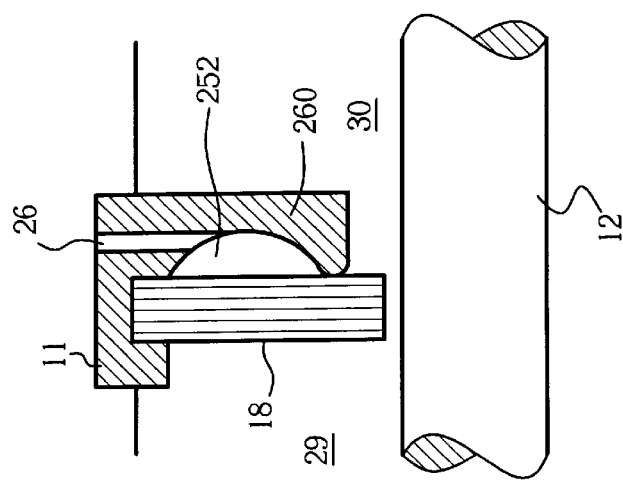
Figure 10C:
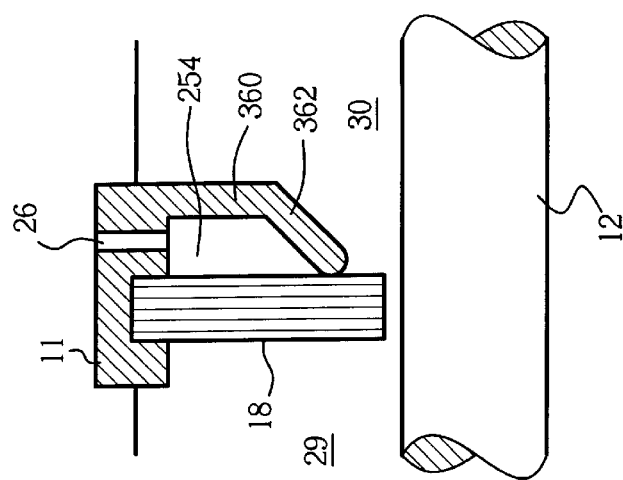

FIGS. 10a–10c depict alternative arrangements for the backing member. These arrangements may be used in any of the previously-described embodiments.

As shown in FIG. 10a, a portion of backing member 160 is substantially triangular in cross section, with an end closest to shaft 12 being wider than the portion of backing member 160 closest to housing 11. The end of backing member 160 closest to shaft 12 also engages bristle layer 18 in a manner similar to flange 24 shown in FIGS. 1 and 3. Since backing member 160 is triangular in shape, a substantially triangular chamber 250 is formed between bristle layer 18 and a portion of backing member 160, so that a substantial length of bristle layer 18 is spaced out of contact with backing member 160. Pressurized fluid is supplied to chamber 250 through passage 26, in a manner disclosed in any of the above-described embodiments.

Backing member 260 shown in FIG. 10b has a curved shape such that backing member 260 engages bristle layer 18 at a location proximate shaft 12 and at a location proximate housing 11. Given the curved shape, backing member 260 is spaced out of contact with bristle layer 18 between the two locations of contact and defines a substantially semi-circular pressure chamber 252 between bristle layer 18 and backing member 260.

Backing member 360 shown in FIG. 10c is similar to backing member 16 shown in FIG. 1 in that it has a downwardly extending portion substantially parallel to bristle layer 18. However, instead of a radially extending flange 24 shown in FIG. 1, backing member 360 includes a sloped extension or flange 362 that extends downwardly from the parallel portion of backing member 360 toward the end of bristle layer 18 adjacent shaft 12. As a result, backing member 360 forms a trapezoidal-shaped pressure chamber 254 that, similar to chambers 250 and 252 receives pressurized fluid to support bristle layer 18 out of contact with the backing member.

Each of pressure chambers 250, 252, and 254 is supplied with pressurized fluid through passage 26. Any of the pressurized fluid sources and the manners in which fluid is supplied to the chamber described in the previous embodiments may be used in these embodiments. For example, fluid may be supplied via a constriction 26a in passage 26 as shown in FIG. 1, through a passage 42 communicating with passage 26 such as shown in FIG. 4, through passages 46 and 26 such as shown in FIG. 7, or through the arrangement shown in FIG. 9.

In the above-disclosed exemplary embodiments, the majority (e.g., at least 50% of the length) of the bristle layer is not in contact with and supported by a solid surface, for example a backing plate 16. The removal of this solid surface from contact with the bristle layer 18 and replacement, at least in part, with a fluid pressure support allows the individual bristles to move more freely, alleviating some of the problems associated with prior seal arrangements as mentioned earlier.

What is claimed is:

1. A brush seal for sealing a leakage gap between relatively movable parts in a flow path between a high fluid pressure region and a low fluid pressure region, comprising a backing member, a bristle layer positioned on one side of the backing member, the backing member adapted to be interposed between the bristle layer and the low fluid pressure region, a portion of the bristle layer being spaced from the backing member to define at least one chamber between the bristle layer and the backing member and adjoining the bristle layer, and means for supplying the at least one chamber with fluid at a pressure higher than the pressure of the low fluid pressure region.

2. The brush seal of claim 1, wherein the bristle layer comprises a first surface that is substantially exposed to the high fluid pressure region.

3. The brush seal of claim 1, wherein the chamber is enclosed by the bristle layer and the backing member.

4. The brush seal of claim 1, wherein the at least one chamber comprises a like number of concave regions formed in the face of the backing member adjacent the bristle layer.

5. The brush seal of claim 4, wherein the concave regions are formed by an axially extending flange upstanding from the face of the backing member which engages the bristle layer.

6. The brush seal of claim 1, wherein the chamber is divided into a plurality of sub-chambers, the supplying means supplying each of the sub-chambers with fluid at a pressure higher than the pressure of the low fluid pressure region.

7. The brush seal of claim 1, wherein the pressure in the chamber is substantially equal to the pressure of the high fluid pressure region.

8. The brush seal of claim 1, wherein the pressure the chamber is higher than the pressure of the high fluid pressure region.

9. The brush seal of claim 1, wherein the porosity of the bristle layer in a region overlying the at least one chamber is increased relative to the remainder of the bristle layer.

10. The brush seal of claim 1, wherein the porosity of the bristle layer in a region overlying the at least one chamber is decreased relative to the remainder of the bristle layer.

11. The brush seal of claim 10, wherein the porosity of the region is decreased by a second layer of bristles overlying the bristle layer in the region.

12. A brush seal for sealing a leakage gap between relatively movable parts in a flow path between a high fluid pressure region and a low fluid pressure region, comprising a backing member, a bristle layer positioned on one side of the backing member, the backing member adapted to be interposed between the bristle layer and the low fluid pressure region, the backing member and a portion of the bristle layer defining a chamber between the backing member and the bristle layer, and means for supplying the chamber with fluid at a pressure higher than the pressure of the low fluid pressure region, wherein the fluid supplied to the chamber supports the portion of the bristle layer out of contact with the backing member.

13. The brush seal of claim 12, wherein the bristle layer comprises a first surface that is substantially exposed to the high fluid pressure region.

14. The brush seal of claim 12, wherein the chamber is enclosed by the bristle layer and the backing member.

15. The brush seal of claim 12, wherein the at least one chamber comprises a like number of concave regions formed in the face of the backing member adjacent the bristle layer.

16. The brush seal of claim 12, wherein the concave regions are formed by an axially extending flange upstanding from the face of the backing member which engages the bristle layer.

17. The brush seal of claim 12, wherein the chamber is divided into a plurality of sub-chambers, the supplying means supplying each of the sub-chambers with fluid at a pressure higher than the pressure of the low fluid pressure region.

18. The brush seal of claim 12, wherein the pressure in the chamber is substantially equal to the pressure of the high fluid pressure region.

19. The brush seal of claim 12, wherein the pressure the chamber is higher than the pressure of the high fluid pressure region.

20. The brush seal of claim 12, wherein the porosity of the bristle layer in a region overlying the at least one chamber is increased relative to the remainder of the bristle layer.

21. The brush seal of claim 12, wherein the porosity of the bristle layer in a region overlying the at least one chamber is decreased relative to the remainder of the bristle layer.

22. The brush seal of claim 12, wherein the porosity of the region is decreased by a second layer of bristles overlying the bristle layer in the region.

23. A brush seal for sealing a leakage gap between relatively movable parts in a flow path between a first fluid pressure region and a second fluid pressure region having a pressure lower than the first fluid pressure region, comprising:

a bristle layer extending lengthwise between the relatively movable parts and having a first side facing the first fluid pressure region and a second side facing the second fluid pressure region;

a backing member positioned between the bristle layer and the second fluid pressure region, the backing member having a first surface facing the second surface of the bristle layer, the backing member contacting the bristle layer at first and second locations along the length of the bristle layer, the backing member being spaced from the bristle layer in an area between the first and second locations to define a chamber between the bristle layer and the backing member, the chamber being pressurized at a pressure higher than the second fluid pressure region to maintain the second surface of the bristle layer out of contact with the backing member between the first and second locations.

24. The brush seal of claim 23, wherein the bristle layer comprises first and second opposite ends, the first location of contact between the backing member and the bristle layer being proximate to the first end of the bristle layer, and the second location of contact between the backing member and the bristle layer being proximate to the second end of the bristle layer.

25. The brush seal of claim 23, wherein the bristle layer and the backing member are annular and the first and second locations of contact each define a circular region.

26. A method for sealing a leakage gap between relatively movable parts in a flow path between a high fluid pressure region and a low fluid pressure region, comprising:

positioning a bristle layer between the high and low fluid pressure regions;

positioning a backing member between the bristle layer and the low fluid pressure region, the backing member and a portion of the bristle layer defining a chamber between the backing member and the bristle layer; and supplying the chamber with fluid at a pressure higher than the pressure of the low fluid pressure region to support the portion of the bristle layer out of contact with the backing member.

* * * * *